Patented Feb. 21, 1933

1,898,840

UNITED STATES PATENT OFFICE

ROY H. KIENLE, OF SCHENECTADY, NEW YORK, ASSIGNOR TO GENERAL ELECTRIC COMPANY, A CORPORATION OF NEW YORK

RESINOUS COMPOSITIONS AND METHOD OF PREPARING THE SAME

No Drawing.  Application filed June 10, 1930. Serial No. 460,302.

The present invention relates generally to the production of resinous compositions resulting from the chemical combination of oil glycerides, such as the drying and semi-drying oils, with resins of the polyhydric alcohol-polybasic acid type, which resins are also known as alkyd resins.

More specifically this invention is concerned with a novel method of imparting air-drying properties to such resinous compositions which are prepared in a manner set forth in the copending application of L. V. Adams, Serial No. 118,604, filed June 25, 1926, and assigned to the same assignee as the present invention. In the said Adams application there is set forth one of the simplest ways of effecting blends between oils and any alkyd resin. Such a method consists briefly in heating the desired amounts of the resin and oil in an autoclave at temperatures between 190 and 230° C., usually at about 200° C., for a prolonged period of time. Such blends while easily attained and homogeneous, are nevertheless, useful only as baking varnishes. The blends are, moreover, capable of being hardened by heat only in film form. It is apparent that if such blends could be rendered air-drying, a more economical, useful and generally desirable product would result.

I have discovered a simple and efficient method whereby I can convert such resinous compositions, prepared as described above and which are adapted only as baking varnishes, to air-drying products.

In order that my invention may be more fully understood and practised by those skilled in the art to which it pertains, I shall describe it more in detail and point out its scope in the appended claims.

I have discovered that if I treat blends of alkyd resins and oils produced by autoclaving, as set forth in the above named copending application, with polyhydric alcohols containing more than two hydroxyl groups in the molecule I can induce gellation of these blends. I have further made the surprising and important discovery that by treating these blends with such polyhydric alcohols they may also be made air drying where previously they could only be set up into film form by baking.

While I do not wish to be limited to the precise theory which I shall set forth as to the above behavior, the best explanation I now have is as follows:

In the method of blending resins of the alkyd type with oils, such for example, as drying oils, by heating the mass in an enclosed space, a degelling process takes place with the oils resulting in a certain portion of the oil gel being thermally decomposed to give high boiling liquid acids which solvate the unchanged portion of the gel, gradually transforming the mass into a liquid state. Apparently, the reason why the oil-alkyd resin autoclaved blends would only set up as films by baking was due to the free uncombined liquid acidic materials present. By introducing a polyhydric alcohol and causing reaction to take place therein these uncombined liquid acidic materials are caused to combine with the alcohol to give the surprising result, namely, air-drying blends.

In order to illustrate my invention more particularly, the following specific examples are cited, it being understood that the same are merely for the purposes of illustration and in no way limit the scope of the present invention.

Example 1

A 70–30 blend of straight glycerol-phthalate resin and linseed oil was prepared by autoclaving the ingredients for five hours at 200 to 220° C. The blend was then transferred to a container, 5% of glycerine added, and the mass further heated in the open at 240 to 260° C. until a small drop placed on a hot plate at 200° C. gelled in approximately 2½ minutes. The resulting resin was then divided into two portions. One portion was further heated to see if it would gel. It gelled in about an hour. The other portion was made into a varnish by dissolving it while still hot in a solvent mixture comprising equal parts of toluol and high-flash naphtha. After cooling to room temperature, films were made from the resulting varnish which air dried absolutely tack free in fifteen hours.

Example 2

Instead of glycerol-phthalate resin as used in Example 1, an alkyd resin was used prepared from—

| | Grams |
|---|---|
| Glycerine | 92 |
| Phthalic anhydride | 191 |
| Rosin | 95 | and the procedure of Example 1 followed.

The resulting varnish films dried tack free in eight hours.

Example 3

The same procedure was followed as in Example 1 except that an alkyd resin of the following composition was used:

| | Grams |
|---|---|
| Glycerine | 32 |
| Glycol | 60 |
| Phthalic anhydride | 210 |

The resulting varnish films prepared therefrom air-dried in three hours.

Example 4

The same procedure as employed in Example 1 was used in this case but an alkyd resin of the following composition was employed:

| | Grams |
|---|---|
| Glycerine | 92 |
| Phthalic anhydride | 191 |
| Acids, linseed oil | 121 |

In this case the resulting resin, after glycerine was added, readily gelled on heating. The resulting varnish gave films that air-dried tack free in twenty-four hours.

In each of Examples 2, 3 and 4, as in Example 1, glycerine was employed as the polyhydric alcohol to convert the blend from a heat hardening complex to an air drying complex.

Example 5

A 70–30 blend of an alkyd resin similar to that used in Example 4 and using soya bean oil instead of linseed oil was prepared by autoclaving the ingredients for two hours at 200° C. The blend was then divided into two parts. To one part 5% of glycerine was added and the mass heated in the open at 240° C. to approximately a 1 minute cure. The resulting product was divided into two portions; one portion was further heated to see if it would gel. It gelled in about three hours. The other portion was made into a varnish, drier added, and films prepared. The films air-dried tack free in eighteen hours.

Example 6

This was a repetition of Example 5 except that pentaerythritol, polyhydric alcohol containing four hydroxyl groups in the molecule was substituted for the glycerine and added to the remaining portion of the blend obtained in Example 5. On dividing the resulting product, one portion was further heated and gelled in approximately 5 hours; the other portion was made into a varnish from which films were prepared which air-dried in eighteen to twenty hours.

The above demonstrations illustrate clearly that it is possible to effect an air-drying film from an alkyd resin-oil blend which has previously been prepared in such a manner that it is possible to use it only as a baking varnish, by treating the blend as described above with a polyhydric alcohol.

It is to be noted that my invention is not only applicable to straight alkyd resins but it is equally applicable to modified alkyd resins, as shown particularly by Examples 2, 4 and 5 above. While I have employed in the examples given as illustrations, phthalic anhydride as the polybasic acid, and glycerine as the polyhydric alcohol, as primary constituents making up the alkyd resin, the process of my invention is equally applicable to alkyd resins formed from other polybasic acids and other polyhydric alcohols. It is also to be noted, as is illustrated by Example 6 above cited, that polyhydric alcohols other than glycerine may be employed in converting the heat hardening complex to an air-drying complex. It is further to be observed that the amount of such polyhydric alcohol which may be employed in connection with the present invention is relatively small. While I have employed in the examples given 5% of the alcohol, this amount is not intended as a limiting value, for I may vary the amount of alcohol employed. A convenient range which may be given is, for example, up to about 10% by weight.

What I claim as new and desire to secure by Letters Patent of the United States, is:

1. The method which comprises the steps of heating a drying oil and a polyhydric alcohol-polybasic organic acid resin in an enclosed space to a temperature sufficiently high to form a resinous composition which is capable of being hardened by heating in thin films only, adding thereto a polyhydric alcohol having more than two hydroxyl groups in the molecule and heating to form another resinous composition which is capable of being air-hardened.

2. The method which consists in heating a drying oil and a glycerine-phthalate resin in an enclosed space at a temperature and for a length of time required to produce a homogeneous blend capable of hardening by heat in film form and then treating said blend with glycerine to form a composition capable of hardening in the presence of oxygen and in the absence of heat.

3. The method which consists in heating in an enclosed space a degelled drying oil in contact with an alkyl resin to a temperature sufficiently high to produce a heat hardening composition and then heating said composition with a polyhydric alcohol having more than two hydroxyl groups in the molecule to form another composition capable of being air-hardened.

4. The method of converting a resinous composition of the alkyd resin-drying oil type from a heat hardening composition to an air-hardening composition which consists in heating the heat hardening composition in the presence of a polyhydric alcohol having more than two hydroxyl groups in the molecule.

5. The method of converting a heat hardening composition comprising an alkyd resin containing in combined form a drying oil to an air drying resinous composition, which consists in heating said heat hardening composition in the presence of a polyhydric alcohol having more than two hydroxyl groups in the molecule.

6. The method of treating an alkyd resin composition having combined therewith an oil glyceride having dry properties and which composition is capable of hardening by heating in film form only, which consists in adding to said composition a relatively small amount of polyhydric alcohol having more than two hydroxyl groups in the molecule and heating until an air-drying composition results.

7. The method of preparing an air drying resinous composition which consists in heating an oil glyceride having drying properties, a natural resin and a polyhydric alcohol-polybasic organic acid resin in an autoclave at about 200° C. until a heat hardening composition is formed, then adding to said composition a small proportion of polyhydric alcohol having more than two hydroxyl groups in the molecule and continuing the heating until an air drying composition results.

8. The method of treating a heat hardening glycerol-phthalate resin having combined therewith a drying oil, which resin is capable of hardening in film form only by heat, which consists in adding thereto a relatively small amount of glycerine and heating the mass until an air-drying composition results.

9. The method of treating a heat hardening polyhydric alcohol-polybasic organic acid resin having combined therewith a drying oil, which resin is capable of hardening in film form only by heat, which consists in adding thereto about 5% by weight of a polyhydric alcohol having more than two hydroxyl groups in the molecule and heating the mass until an air-drying composition results.

10. The method of treating a heat hardening glycerol-phthalate resin having combined therewith a drying oil, which resin is capable of hardening in film form only by heat, which consists in adding thereto about 5% by weight of glycerine and heating the mass until an air-drying composition results.

11. An air hardening resinous composition produced by heating a heat hardening composition comprising an alkyd resin containing an oil glyceride having drying properties combined therewith in contact with a polyhydric alcohol having more than two hydroxyl groups in the molecule.

12. An air hardening resinous composition produced by heating a heat hardening composition comprising an alkyd resin containing an oil glyceride having drying properties and a natural resin combined therewith in contact with a polyhydric alcohol having more than two hydroxyl groups in the molecule.

13. A composition of matter capable of air-drying in film form and being the product of treatment with glycerine of a glycerine-phthalate resin having a drying oil combined therewith and which resin is capable of heat hardening only in film form.

14. An air hardening resinous composition produced by heating a heat hardening composition of a modified alkyd resin-drying oil type in contact with a polyhydric alcohol having more than two hydroxyl groups in the molecule.

15. An air hardening resinous composition produced by heating a heat hardening composition of the alkyd resin-drying oil type in contact with about 5% by weight of glycerine.

In witness whereof, I have hereunto set my hand this 9th day of June, 1930.

ROY H. KIENLE.

CERTIFICATE OF CORRECTION.

Patent No. 1,898,840.                                                February 21, 1933.

ROY H. KIENLE.

It is hereby certified that error appears in the printed specification of the above numbered patent requiring correction as follows: Page 2, line 130, claim 3, for "alkyl" read "alkyd"; page 3, line 25, claim 6, for "dry" read "drying"; and that the said Letters Patent should be read with these corrections therein that the same may conform to the record of the case in the Patent Office.

Signed and sealed this 9th day of May, A. D. 1933.

M. J. Moore.

(Seal)                                                               Acting Commissioner of Patents.